(12) United States Patent
Frutiger

(10) Patent No.: US 7,142,931 B2
(45) Date of Patent: Nov. 28, 2006

(54) CONTROL SYSTEM WITH CONTROLLED DEAD ZONE

(75) Inventor: Theo Frutiger, Buffalo Grove, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 447 days.

(21) Appl. No.: 10/412,650

(22) Filed: Apr. 11, 2003

(65) Prior Publication Data

US 2004/0064204 A1    Apr. 1, 2004

Related U.S. Application Data

(60) Provisional application No. 60/414,220, filed on Sep. 27, 2002.

(51) Int. Cl.
G05B 11/01 (2006.01)
G05B 5/01 (2006.01)

(52) U.S. Cl. .......................................... 700/72; 318/624

(58) Field of Classification Search ............ 700/28–31, 700/78, 41–43, 276; 318/609–611, 561, 318/621, 624; 708/300, 303, 322, 819; 702/82, 702/85, 190
See application file for complete search history.

(56) References Cited

U.S. PATENT DOCUMENTS

| | | | | |
|---|---|---|---|---|
| 3,628,116 A | * | 12/1971 | Preikschat | 318/590 |
| 3,937,423 A | * | 2/1976 | Johansen | 244/3.22 |
| 3,961,234 A | * | 6/1976 | Chambers et al. | 318/561 |
| 3,979,691 A | * | 9/1976 | Balliet | 331/1 A |
| 3,984,071 A | * | 10/1976 | Fleming | 244/169 |
| 4,509,110 A | | 4/1985 | Levesque, Jr. et al. | |
| 4,556,956 A | | 12/1985 | Dickenson et al. | |
| 5,179,905 A | * | 1/1993 | Hossfield et al. | 114/144 E |
| 5,382,086 A | * | 1/1995 | Tuck et al. | 303/156 |
| 5,405,291 A | | 4/1995 | Alcorn et al. | |
| 5,486,998 A | | 1/1996 | Corso | |
| 5,563,794 A | * | 10/1996 | Cosner et al. | 701/13 |
| 5,757,641 A | * | 5/1998 | Minto | 700/4 |
| 5,768,121 A | * | 6/1998 | Federspiel | 700/28 |
| 5,769,314 A | * | 6/1998 | Drees et al. | 236/49.3 |
| RE37,245 E | | 6/2001 | Scholten et al. | |
| 6,317,637 B1 | * | 11/2001 | Limroth | 700/42 |
| 6,477,450 B1 | * | 11/2002 | Rodden et al. | 701/13 |
| 6,546,295 B1 | * | 4/2003 | Pyotsia et al. | 700/37 |
| 6,560,058 B1 | * | 5/2003 | Hattori | 360/77.08 |
| 6,577,914 B1 | * | 6/2003 | Bode | 700/121 |
| 6,639,375 B1 | * | 10/2003 | Paris | 318/624 |
| 6,644,332 B1 | * | 11/2003 | Winkler | 137/2 |
| 6,772,074 B1 | * | 8/2004 | Millott et al. | 702/56 |
| 6,810,366 B1 | * | 10/2004 | Kendrick et al. | 702/190 |
| 6,847,954 B1 | * | 1/2005 | Wojsznis et al. | 706/23 |

* cited by examiner

*Primary Examiner*—Thomas Pham

(57) ABSTRACT

A method of operating a control device having a setpoint value, an error signal, and a control output is disclosed. The error signal is representative of a difference between a controlled variable and the setpoint value, the control output operable to affect the controlled variable. The method includes generating the control output based at least in part on the error signal and holding the control output at a held value independent of the error signal when the error signal is within a dead zone. The method also includes causing an integrating portion within the control device to track the error signal and the held value when the error signal is within the dead zone.

23 Claims, 6 Drawing Sheets

CONTROL SYSTEM WITH CONTROLLED DEAD ZONE

This application claims the benefit of U.S. Provisional Patent Application Ser. No. 60/414,220, filed Sep. 27, 2002.

FIELD OF THE INVENTION

The present invention relates to control systems, and more particularly, to control systems having a dead zone in which the output is impervious to minimal changes in input signal.

BACKGROUND OF THE INVENTION

Closed loop control systems are used in a variety of processes, including, by way of example, heating, venting and air conditioning ("HVAC") applications. The purpose of such control systems is to control a process variable value x so that it is substantially equal to a setpoint w. If the setpoint w changes, then the control system endeavors to change the process variable x in response thereto.

By way of example, consider a setpoint $T_W$ identifying a desired temperature. The control system may control the operation of a heating vent or the flow of hot water to a heating coil in order to control the actual temperature represented as a process variable $T_X$. If the actual temperature $T_X$ differs from the setpoint $T_W$, then an error signal e is provided to a controller within the control system. The controller then acts upon the error signal e to determine a control signal to generate. The controller, as is known in the art, may employ a transfer function to generate the control signal based on the error signal. The transfer function may incorporate integration, derivation and proportional scaling of the error signal in an effort to create a control system that provides a balanced control of the actual temperature $T_X$.

More specifically, because a control system cannot change the process variable instantaneously as a function of the control signal output, controllers employ sophisticated transfer functions to avoid excessive oscillations in response to changes in setpoint. For example, consider a situation in which setpoint temperature in a room of a building $T_W$ is 20° C. Assume also that the sensed temperature $T_W$ is 20° C. in steady state. If the setpoint temperature $T_W$ is changed from 20° C. to 21.3° C., then the control system may control a process, for example, the flow of hot water through a heating coil, in order to raise the temperature $T_X$. The flow of hot water through the heating coil causes the sensed temperature $T_X$ to slowly rise. Once the ambient or sensed temperature $T_x$ reaches 21.3° C., the control system may decrease or stop the flow of hot water to the register. However, the hot water within the register will continue to heat because it cannot be cooled instantaneously. Thus, the temperature $T_X$ may exceed the set point. Because the temperature process variable exceeds the set point, the control system may turn off the flow of hot water completely. After some time, the temperature would cool to the desired 21.3° C. However, the temperature would continue to fall below 21.3° C. The control system may again cause hot water to flow to bring the temperature back to 21.3° C. but it takes some time for the heating coil to warm up and generate heat. The above described temperature oscillations may continue indefinitely if the control system is not properly tuned. Accordingly, the transfer function is typically chosen such that it reduces or eliminates the possibility of excessive oscillations in the control system.

As discussed above, the transfer functions of closed loop control systems employ known techniques to manipulation of the error signal before calculating the control output. For example, many control systems employ a proportional calculation in which only a fraction of every error signal is incorporated into the calculation of the control output. Proportional control thus tempers or reduces the effect any instantaneous error signal value will have on the output of the system, thereby reducing the potential for large oscillations. One popular form of controller, a PID controller, employs proportional, integrated and differentiated aspects of the error signal to formulate the control output. In a PID controller, the error signal is provided to a proportional circuit, a differentiating circuit, and an integrating circuit. The outputs of the circuits are combined to help generate the control output. The use of such differentiated and integrated aspects of the error signal further improves the response of the control system.

In any event, one issue that arises in control systems is their behavior when the error signal is very close to zero. More specifically, because of many factors, it is difficult to achieve absolutely zero error in control systems, particularly in large control systems such as HVAC control systems. These factors include noise and/or nonlinearities generated by the mechanical equipment, the external environment, and other sources. The noise and nonlinearities introduce non-zero elements into the error signal, even though the nominal (noise free) error signal is zero. These non-zero elements can, without remediation, cause the control system to unnecessarily change its output signal.

Changing a control output typically causes actuation of a mechanical device, for example, movement of a heating vent, opening or closing of a valve, or change in fan speed. Thus, for example, a control output may frequently cause a heating vent to open and close in attempts to achieve zero error. Unnecessary actuation of mechanical devices typically shortens their life cycle. Accordingly, the difficulty in achieving zero error in control systems such as HVAC systems undesirably results in shorter life cycles for elements of the system.

In order to reduce the effects of noise and non-linearities, many control systems employ dead zone or dead zone operation. Dead zone operation typically involves a non-linear dead zone filter that generates an output value of zero if the error signal is within a predetermined range of zero. As a result of dead zone operation, control systems do not have to achieve zero error in order to avoid excess actuation of controlled devices. Thus, noise signals that could otherwise trigger actuation of a controlled device are filtered out by the dead zone filter. An example of a dead zone filter is discussed in U.S. Pat. No. 5,768,121.

The dead zone filtering of error signals in controllers has gained widespread acceptance. However, one drawback related to the use of dead zone filters is the behavior of the controller once the error signal emerges from the dead zone. In particular, from time to time, a set point change or other phenomenon can cause a significant (and temporary) error signal. If the error signal is of sufficient magnitude, the error signal will fall outside the dead zone. At such point, the controller would resume its normal control operations. However, the state of the controller in such cases is not correlated to the error signal when the transition occurs, resulting in "non-linear" behavior of the system.

More specifically, in controllers that employ integration as a part of the transfer function, the controller generates output signals based on recent error signals as well as current error signals. If the error signal is artificially set to zero during dead zone operation, as was done in the prior art, then the recent error signals used by the integrating portion of the controller are also artificially set to zero. As a consequence, the integrating portion of the controller will experience artificial jumps in error when emerging from dead zone operation.

It has been found that such non-linear behavior reduces the efficiency and/or predictability of the control mechanism. There is a need therefore, for some method of obtaining the benefits of dead zone operation while reducing the non-linear effects of such operation.

Accordingly, there is an additional need for a controller that provides dead zone operation that avoids or reduces non-linear behavior when a controller emerges from dead zone operation.

SUMMARY OF THE INVENTION

The present invention addresses the above concerns, as well as others, by providing a method and arrangement for use in a control system in which the controlled output of a controller is held at a constant value when the error is in a dead zone. In addition, the integrating portion of the controller tracks the actual error signal to the held output. As a consequence, the controller will be in an appropriate state when the error signal emerges from the dead zone and the controller resumes generating the control output as a function of the error signal.

A first embodiment of the invention is a method of operating a control device having a set point value, an error signal, and a control output, the error signal representative of a difference between a controlled variable and the set point value, the control output operable to affect the controlled variable. The method includes generating the control output based at least in part on the error signal and holding the control output at a held value independent of the error signal. Preferably, the control output is held when the error signal is within a dead zone. The method also includes causing an integrating portion within the control device to track the error signal and the held value.

Another embodiment of the invention is a control system that includes an actuator and a controller. The actuator has a first input and is operable to effectuate a process in response to the first input. The controller is operably coupled to receive the process variable and a set point value, the process variable representative of an output of the process. The controller is further operably connected to provide a control output to the first input of the actuator. The controller is operable to generate an error signal representative of a difference between the controlled variable and the set point value, generate the control output based at least in part on the error signal, hold the control output at a held value independent of the error signal, and cause an integrating portion within the controller to track the error signal and the held value.

Preferably, the above embodiments hold an output value when an error signal is determined to be in a dead zone, and further cause an integrating portion of the control device to track to the held value even when the error signal is in the dead zone. The tracking feature reduces the non-linearities in the operation of the control device when it transitions out of dead zone operation. This is because the tracking mechanism ensures that the two outputs, the held output and the internal updated output, coincide at the time that the controller switches back to control (i.e. when it is determined that the error is out of the dead zone).

It will be appreciated that the above described features and advantages, as well as others, will become more readily apparent to those of ordinary skill in the art by reference to the following detailed description and accompanying drawings.

DETAILED DESCRIPTION

Figure 1:
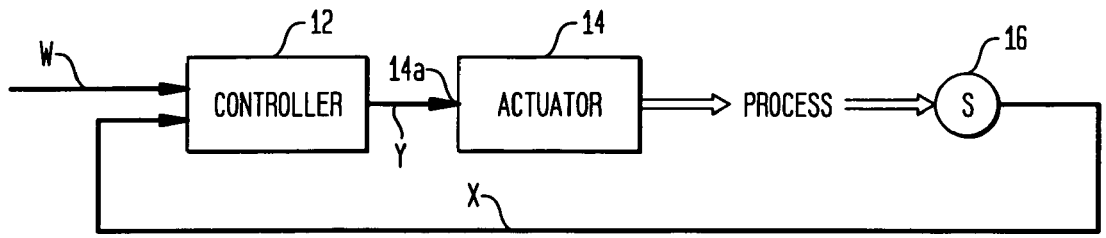
FIG. 1 shows a schematic block diagram of a control system that incorporates aspects of the present invention.

FIG. 1 shows a schematic diagram of a control system 10 according to the present invention. The control system 10 includes a controller 12, an actuator 14, and a sensor 16. In general, the control system 10 operates to attempt to control a process variable x, such as temperature, flow, position or the like, in accordance with a set point value w, which represents a desired temperature, flow, position or the like. By way of example, the set point w may represent a desired temperature, and the process variable x may represent the actual measured temperature. The control system 10 operates to control one or more physical devices, via the actuator 14, to cause the process variable x to have a value that corresponds to the set point value w.

Referring again to the general implementation of FIG. 1, the actuator 14 has a first input 14a and is operable to affect a process in response to signals received at the first input 14a. By way of example, the actuator 14 may be the actuator of a water valve in a heating coil, or an actuator of a vent damper. The affected process may be an air flow process, heating process, water flow process, or even a non-HVAC related process. The actuator 14 is the physical mechanism that causes the change in the process variable x in response to a control output provided by the controller 12.

The sensor 16 is a device that obtains the process variable value. For example, the sensor 16 may be a temperature sensor that obtains a process variable value in the form of a temperature reading. In other examples, the sensor 16 may be a flow sensor, or merely a position sensor in the case of a vent damper. In any event, the sensor 16 provides a measure of the condition or variable that the control system 10 is intended to control.

The controller 12 is a device or circuit that is coupled to receive the process variable value x, the set point value w, and generate the control output y therefrom. The controller 12 may suitably be a processor, a discrete digital circuit, or a combination or one or more processing devices and digital circuits. The controller 12 may further contain analog circuitry that receives inputs and generates outputs, including A/D and D/A converters. Such controllers are well known.

Figure 1A:
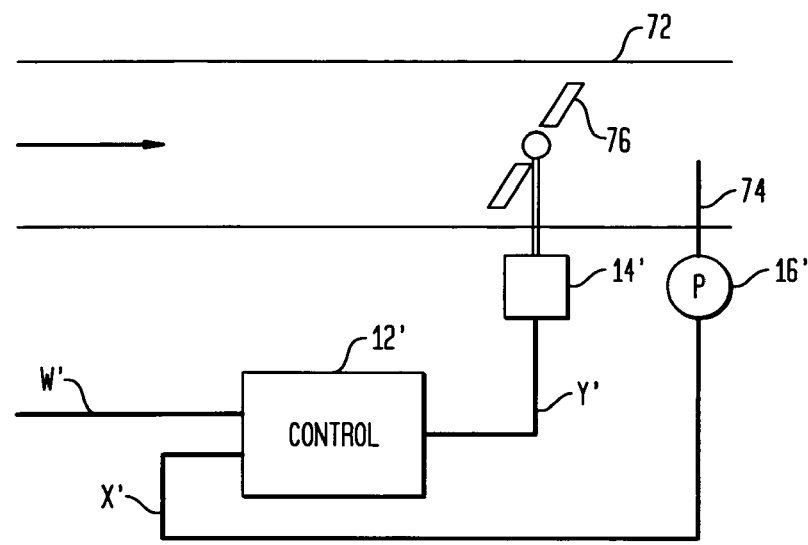
FIG. 1a shows a first exemplary embodiment of the control system of FIG. 1.
Figure 1B:
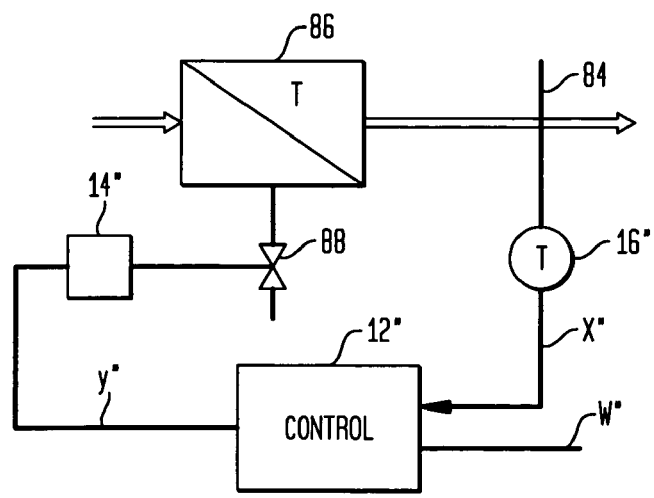
FIG. 1b shows a second exemplary embodiment of the control system of FIG. 1.

FIGS. 1a and 1b illustrate two nonlimiting implementations of the control system 10 of FIG. 1. FIG. 1a shows a first exemplary embodiment of the control system 10 in which the process under control is the air flow through a duct or conduit 72. The controller 12' is coupled to receive a process variable x' representative of measured air flow from a pressure sensor 16'. To this end, the pressure sensor 16' includes a probe 74 disposed within the conduit 72 at which point the air flow is measured. The controller 12' is further operably coupled to receive a set point value w' that identifies a desired air flow value. The set point value w' may be generated by an operator, or by another control system, not shown.

In any event, the controller 12' of FIG. 1a attempts cause the air flow measured by the pressure sensor 16' to correspond to the set point value w'. To this end, the controller 12' may suitably cause an increase or decrease in air flow by causing a damper 76 disposed within the conduit 72 to open or close to a greater extent. The controller 12' controls the position of the damper 76 by providing a control output value y' to an actuator 14' that is operable to mechanically adjust the position of the damper 76.

In general operation, if the set point w' exceeds the measured air flow x', then the controller 12' generally provides a set of control output signals y' to the actuator 16' that cause the actuator 16' to further open the damper 76. Further opening the damper 76 should increase the air flow, thereby increasing x'. Contrariwise, if the measurement air flow x' exceeds the set point w', the controller 12' generally provides a set of control output signals y' to the actuator 16' that cause the actuator 16' to further close the damper 76, thereby reducing x'.

FIG. 1b shows another exemplary embodiment of the control system 10 of FIG. 1. In the embodiment of FIG. 1b, the process under control is the temperature within an area of a building. The controller 12" is coupled to receive a process variable x" representative of measured temperature from a temperature sensor 16". The temperature sensor 16" includes a probe 84 disposed within the area of the building. The controller 12" is further operably coupled to receive a set point value w" that identifies a desired temperature value. The set point value w" may be generated by manual adjustment of a thermostat, not shown or by another system, not shown.

In any event, the controller 12" of FIG. 1b attempts cause the temperature measured by the temperature sensor 16" to correspond to the set point value w". To this end, the controller 12" may suitably cause an increase or decrease in temperature by causing an increase or decrease in hot water passing through a heating coil 86 that is disposed in a heat exchange relationship with the room. The controller 12" controls the hot water flow within the heating coil 86 by providing a control output value y" to an actuator 14" that is operable to mechanically adjust a valve 88, which in turn regulates the flow of hot water through the heating coil 86.

The above examples described in connection with FIGS. 1a and 1b illustrate two of many possible environments in which the controller 12 according to the present invention may be employed.

Returning to the generalized description of FIG. 1, the controller 12 includes a summation device or the like, (see e.g. FIG. 3), that generates an error signal e based on the difference between the process variable value x and the set point value w. The controller 12 further operates to generate the control output value y based on the error signal e using a closed loop control transfer function. Preferably, the controller 12 employs proportional, integral, and derivative ("PID") control techniques, proportional and integral ("PI") techniques, or other control techniques that involve integration. The use of control techniques that involve integration generally show advantageous tracking and converging characteristics, as is known in the art. In any event, the transfer function of the controller 12 endeavors to control the control output value y in such a manner as to ultimately reduce the error signal e.

The controller 12 is further operable to generate a held output value at its control output value y when the error signal e is within a dead zone. The held output value is a temporarily constant value that is not updated in response to changes in the error signal e. As a result of holding the control output value while the error signal is within the dead zone, excessive unnecessary operation of the actuator 14 may be avoided, as discussed further below.

More specifically, the dead zone may suitably be defined as a range of error signal values that fall between positive and negative thresholds. Thus, if the error signal is below a positive threshold or above a negative threshold, then the error signal is in the dead zone. The positive and negative thresholds are typically relatively close to zero. By way of example, if the error signal e is representative of a temperature error, then a particular control system may define the dead zone as ±0.2 degrees Celsius. The dead zone should be chosen such that the overall goal of the control process is not defeated. For example, if the control system is an HVAC space temperature control system, a dead zone of ±3 degrees Celsius would be too large and defeat the goal of providing a comfortable environmental temperature. In addition, the dead zone is preferably at least larger than the noise floor of the system. Those of ordinary skill in the art may readily determine an appropriate dead zone for their implementation.

In accordance with one aspect of the invention, the controller 12 further performs a filtering operation on the error signal e to obtain a filtered error signal prior to determining whether the error signal is within the dead zone. In such a case, if the filtered error signal is within the dead zone (i.e. within a predetermined range of zero), then the controller 12 generates the held control output value. If, however, the filtered error signal is outside the dead zone, then the controller 12 will continue to generate the control output value based on the error signal e, even if the instantaneous error signal is within the dead zone range.

Thus, the controller 12 only holds the control output value if the filtered error signal is near zero. As a result, the controller 12 effectively suppresses dead zone operation when the error signal is merely transitioning through the dead zone in a larger oscillatory swing. As discussed further above, an error signal may be near zero at any particular instant either because the controller 12 has settled with nearly zero error, or because the error signal is in transition and passing through zero.

When the error signal is merely transitioning through zero, the filtered error signal in the controller 12 remains outside the dead zone thresholds. To this end, the filter may suitably be embodied as a low pass filter, such as a filter that calculates a moving average. Examples of such filters are discussed below in connection with FIGS. 3, 4 and 5.

The use of the filtered error signal provides the advantage of distinguishing between circumstances in which the error signal is merely transitioning through zero and circumstances in which the error signal is settling at or near zero. This determination is used to inhibit unnecessarily implementation of dead zone operation (i.e. holding of the control output variable). As discussed above, dead zone operation during circumstances in which the error signal is in transition introduces an undesirable non-linearity into the control function of the controller 12. By contrast, such non-linearity is tolerable when the controller 12 has settled at or near zero error.

Figure 2:
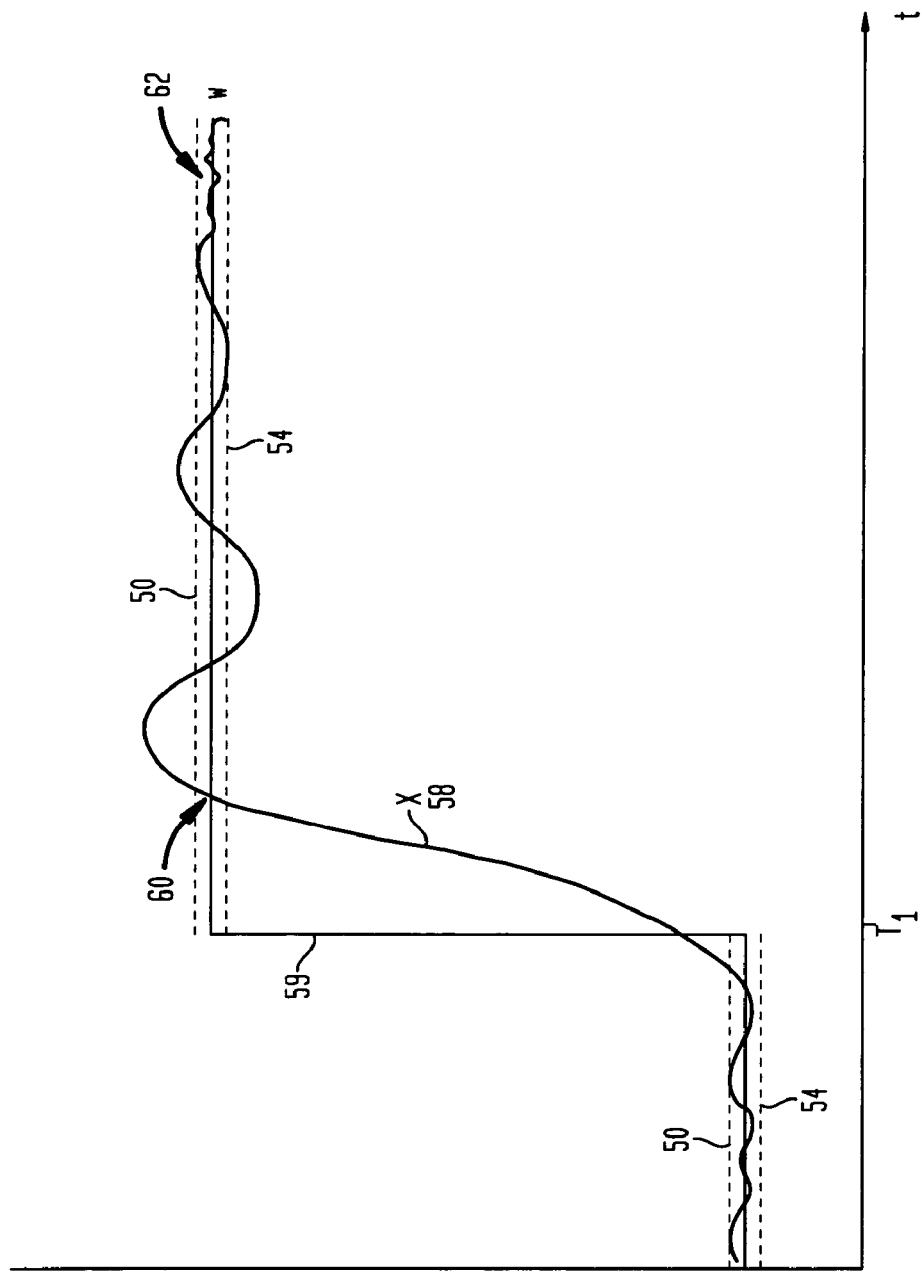
FIG. 2 shows a timing diagram of various signals of the control system in response to a step function.

By way of example, FIG. 2 shows an exemplary timing diagram of a step input response of a control system. The set point w is illustrated as a function of time by the step function curve 59. The process variable value x is shown as a function of time by the curve 58. The error signal e at any point in time is represented as the distance between the process variable curve 58 and the set point curve 59. Accordingly, the dead zone thresholds are illustrated as straight lines 50 and 54, which are located on either side of the set point curve 59.

In FIG. 2, the controller 12 undergoes a step input change in the set point w at a time $T_1$. For example, a temperature set point may have been changed from 21° C. to 24° C. The process variable value curve 58 shows the typical settling oscillations of a process variable value after a step change in set point.

In particular, a first portion of the curve 58 shows the process variable value x passing through the dead zone in a first positive transition 60. Even though the error signal is within the dead zone during the first positive transition 60, it does not represent mere noise or some other insignificant input to the system, but rather represents the intended operation of the control algorithm. In other words, the controller 12 is still attempting to converge or settle. Thus, there is no real advantage to isolating the output of the controller 12 from the error signal via dead zone operation. Indeed, isolating the output in such a case undesirably introduces nonlinear behavior at a critical point of the operation of the controller 12.

The second part of the curve shows the error signal e after the controller 12 has converged or settled. In this settled portion 62 of the curve, the small error signals are more likely to result from system noise. Accordingly, it is advantageous to reduce or eliminate their influence on the controller 12.

Moreover, even if the small error signals are not the result of system noise, it may still be advantageous to suppress the influence of such small errors on the operation of the controller 12. For example, if the set point temperature is 21.0° C. and the ambient temperature is 21.2° C., then it is not necessarily cost beneficial to operate a vent or valve actuator to effect such a small change in temperature.

In any event, once the controller 12 has settled as shown in the settled portion 62 of the curve 58, the dead zone operation of the controller 12 operates to isolate the control output from the error signal. The controller 12 continues in dead zone operation until the filtered error signal subsequently transitions beyond the dead zone thresholds.

Figure 4:
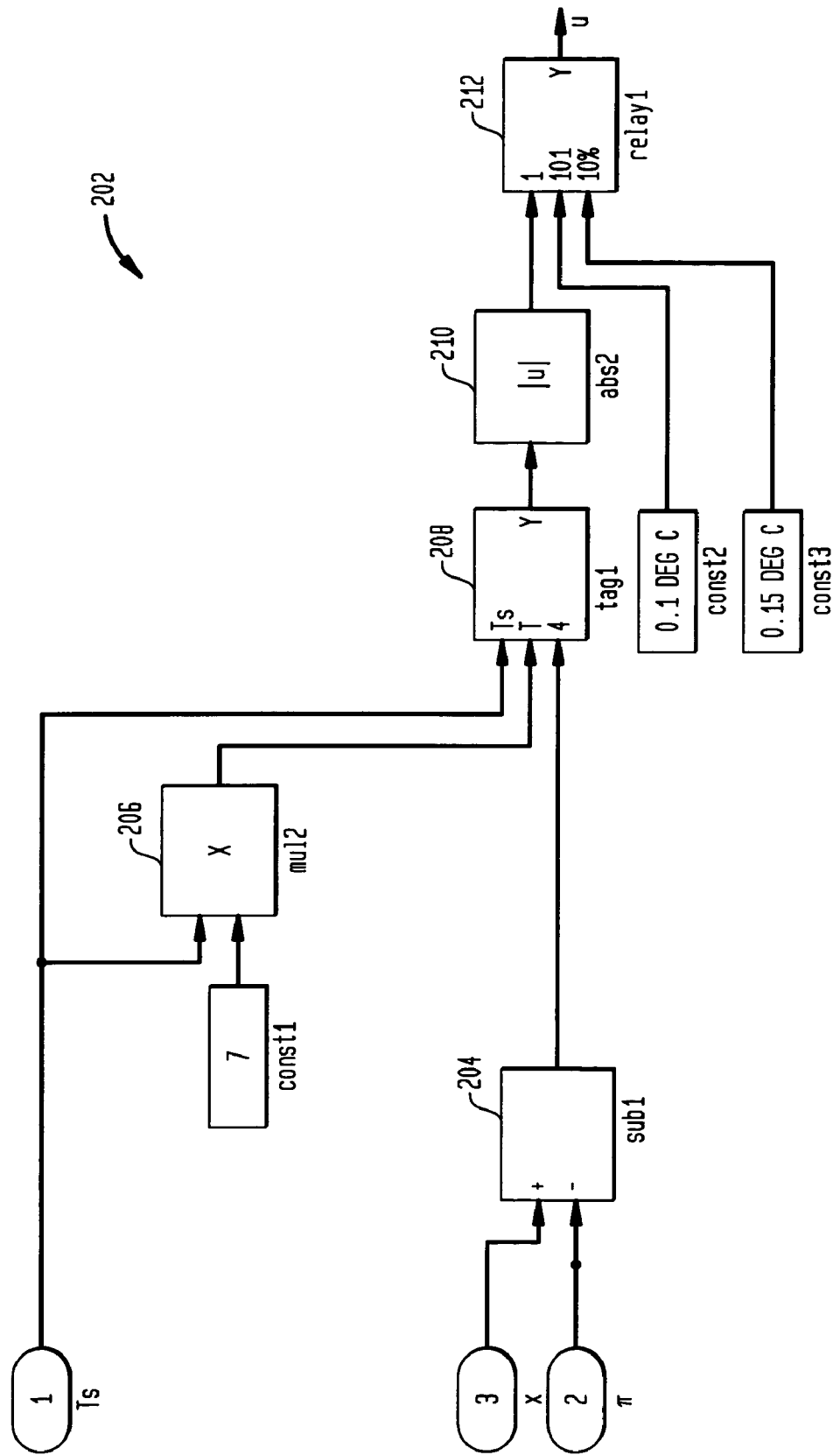
FIG. 4 shows a schematic block diagram of a first exemplary embodiment of an error signal filter that may be used in the controller of FIG. 3.
Figure 5:
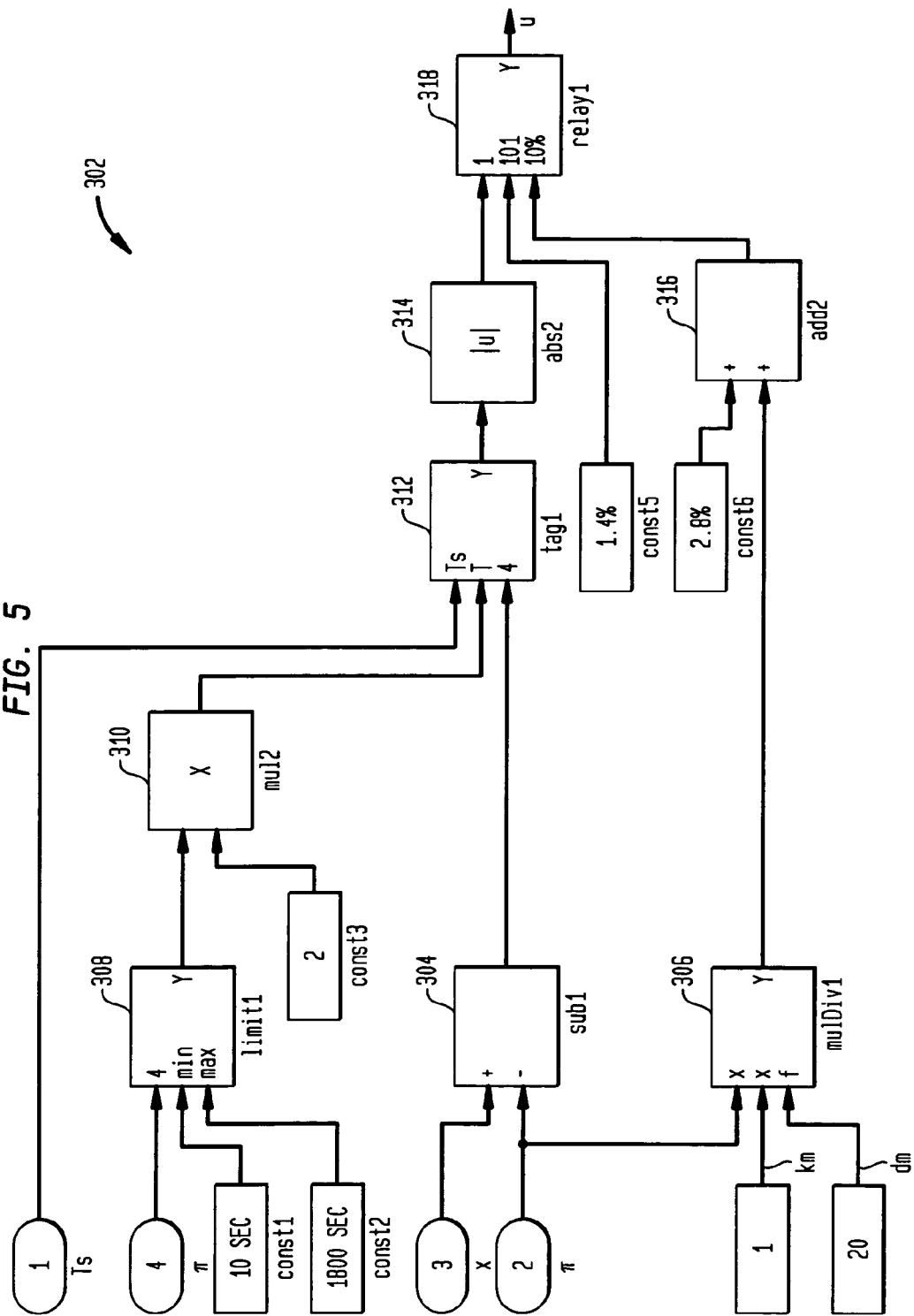
FIG. 5 shows a schematic block diagram of a second exemplary embodiment of an error signal filter that may be used in the controller of FIG. 3.

As discussed above, to inhibit dead zone operation during transition of the error signal through zero, the preferred embodiment of the controller 12 employs a filter, not shown, for filtering the error signal before determining whether the error signal is adequately settled near zero to justify holding the control output value. The filter may suitably be a low pass filter, which is capable of distinguishing transitional signal values, such as those in the positive transition 60 of FIG. 2, from near constant low error signal values, such as those in the settled portion 62 of FIG. 2. Nonlimiting examples of suitable filters are shown in FIGS. 4 and 5 and are discussed below.

In accordance with another aspect of the present invention, the controller 12 also causes an integrating portion within the controller 12 to track to the error signal and the held value when the error signal is within the dead zone. By tracking to the error signal and held value, it is meant that the integrating portion calculates its internal output value based at least in part on the held value and the error signal. To this end, the controller 12 provides to its integrating portion both the error signal e and the difference between the held control output and an output generated by the controller in response to the error signal. Further detail regarding the tracking to the error signal and the held output value is provided below in connection with FIG. 3. The tracking feature thereby ensures that the two outputs, the held control output and the internal output value, coincide at the time that the controller switches back from dead zone operation to regular control operation. This is called bumpless transfer.

In particular, during dead zone operation, the error signal may be non-zero for a significant amount of time. Without tracking as described above, the integrator of the controller 12 would progressively accumulate the non-zero error signal, resulting potentially in a high integrating value that is unconnected to the actual output of the system. In such a case, when the error signal eventually emerges from the dead zone and the controller 12 resumes normal control operations, distorted control behavior ("bump") results from the integrating portion being "unconnected". By tracking the integrator to the error signal and the held output signal, the controller 12 may pass smoothly from dead zone operation to normal control operations.

It will be appreciated that the controller 12 of FIG. 1 thus incorporates two related, but independently useful inventions. One invention relates to the use of a filtered error signal by a closed-loop controller in order to suppress dead zone operation when an error signal is merely transitioning through zero. The other invention involves tracking an integrating portion of the closed loop controller to the held output during dead zone operation to achieve a bumpless transfer when the closed loop controller emerges out of dead zone operation. At least some of the benefits of employing a filtered error signal to determine whether to commence dead zone operation may be obtained even without employing tracking to achieve a bumpless transfer. Similarly, at least some of the benefits of a bumpless transfer out of dead zone operation even if the determination to enter into dead zone operation is accomplished with an unfiltered error signal, or using some other dead zone determination technique.

Figure 3A:
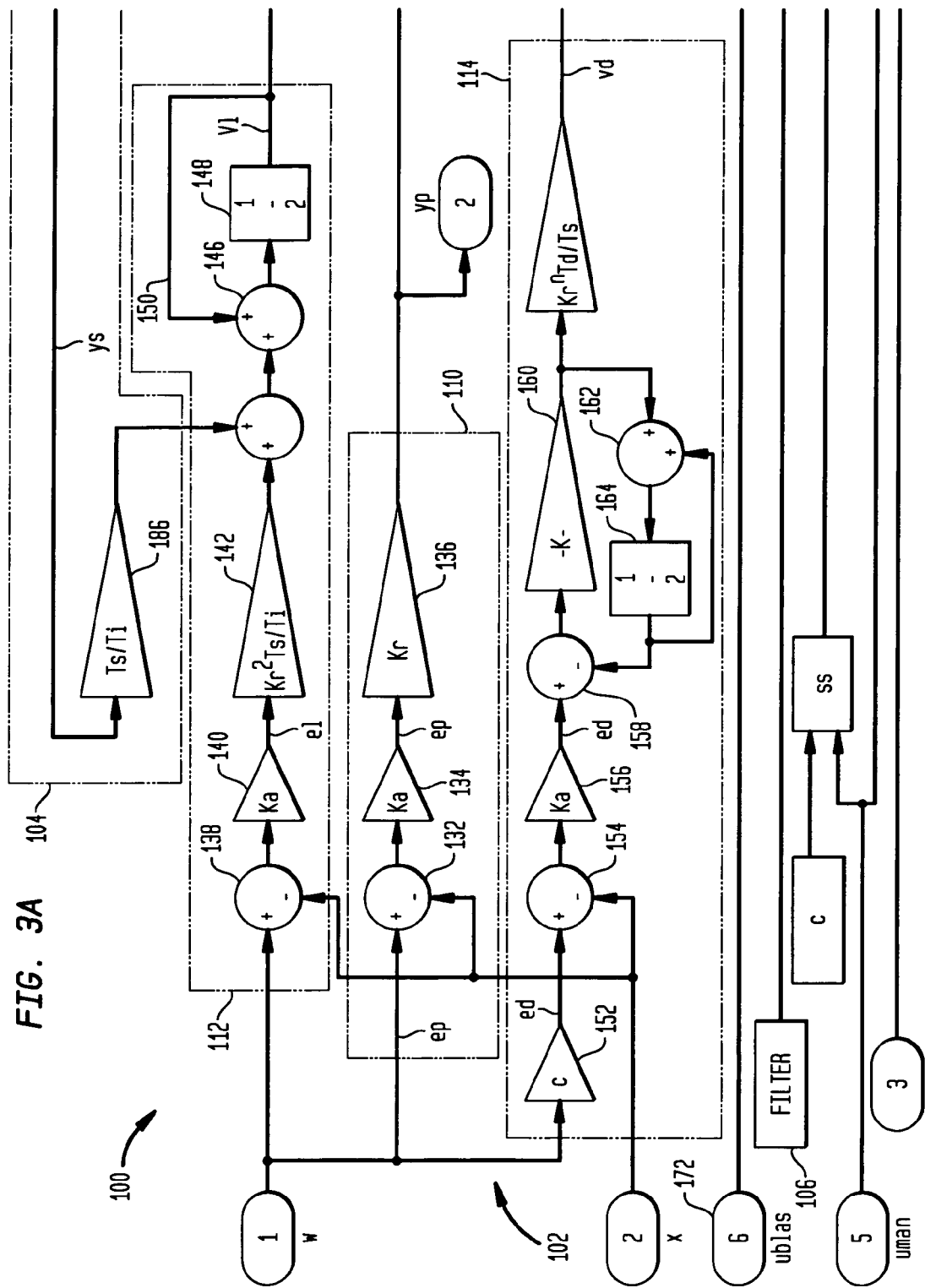
FIG. 3 shows a schematic block diagram of an exemplary controller that may be used in the control system of FIG. 1.
Figure 3B:
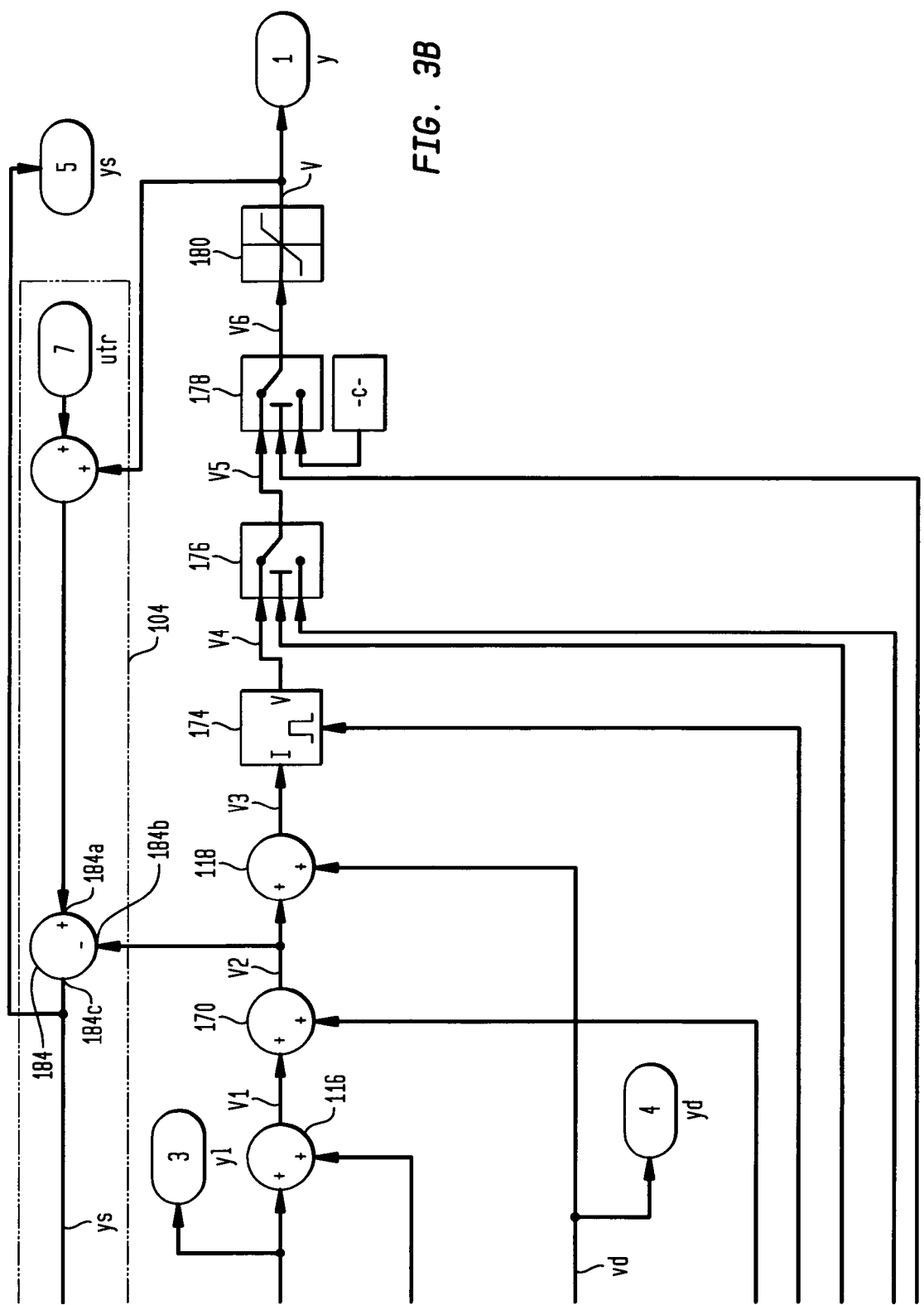

FIG. 3 shows an exemplary implementation of a controller 100. The controller 100 is shown in block diagram form for purposes of clarity of exposition. The block diagram of FIG. 3 may readily be implemented as discrete digital circuits, one or more programmed processing devices, or a combination thereof. The term circuit is used herein to describe one or more of the functional blocks of FIG. 3. It will be understood that a circuit as used herein may be a select group of elements of a software program or algorithm being executed by a processing device, a combination of analog electrical elements, a combination of digital devices, or a combination of any of the above.

In the exemplary embodiment described herein, however, the controller 100 is a processing device and the functional blocks or circuits represent software operations that are executed by the processing device. In general, the various input signals are provided as discrete digital samples.

Referring now to FIG. 3, the controller 100 includes a PID control module 102, a tracking circuit 104, and a filter 106. The PID control module 102 in general is operable to perform normal PID control functions, and namely, generating a controlled output y3 in response to an error signal generated from a process variable value x and a set point value w. To this end, the PID control module 102 includes a proportional portion 110, an integrating portion 112, and a derivative portion 114. Each of the portions 110, 112 and 114 is configured to receive the set point value w and the process variable value x. Generally, each of the portions 110, 112 and 114 determines an error signal based on the difference between w and x, and further generates a portion of the controlled output y3 based on the determined error signals, as will be discussed below in further detail. The outputs of the portions 110, 112 and 114 are further connected to provide their portions of the controlled output to the summation devices 116 and 118. The summation devices 116 and 118 then combine the portions, along with a bias factor, to generate the controlled output y3.

The controlled output y3, however, does not necessarily constitute the overall output y of the controller 100. The PID control module 102 includes various output configuration elements, for example, a sample and hold element 174, a manual override switch 176, and an enable switch 178. Such elements allow for selective replacement of the PID control-generated value y3 with other values. For example, the sample and hold element 174 is configured to hold the control output y at a particular value, thus overriding the generated value y3 from updating the control output y. Thus, the sample and hold element 120 is used to implement dead zone operation, as will be discussed further below.

Referring now to the specific architecture of the proportional portion 110 of the in the exemplary embodiment of FIG. 3, the proportional portion 110 includes an error summation 132, an inverter 134, and a proportional gain amplifier 136.

The error summation 132 is operably coupled to receive the set point w and the process variable value x. The error summation 132 is operable to provide the difference between those values, the proportional error signal $e_p$ to the inverter 134. The inverter 134 is a multiplier that may optionally be set to −1 to reverse the sign of $e_p$ if desired. Otherwise, the inverter 134 simply passes through the non-inverted value. The inverter 134 provides the inverted or non-inverted proportional error signal $e_p$ to the proportional gain amplifier 136. The proportional gain amplifier 136 operably multiples the scaled proportional error signal by the proportional gain kr of the control module 102. The proportional gain kr, as is known in the art, defines the extent to which the current error signal e affects the control output y3 of the control module 102. The output of the proportional gain amplifier 136 is the proportional portion control output yp, which is equal to $e_p$*kr. The proportional gain amplifier 136 is operably coupled to provide the proportional portion control output yp to the summation device 116.

Referring now to the specific architecture of the integrating portion 112 of the in the exemplary embodiment of FIG. 3, the integrating portion 112 includes, an error summation 138, an inverter 140, an integrator gain amplifier 142, a tracking input 144, an integrating summer 146, and a delay 148. The error summation 138 is operably coupled to receive the set point w and the process variable value x. The error summation 138 is operable to provide the difference between those values, which represents the error signal $e_i$, to the inverter 140. Similar to the inverter 134, the inverter 140 optionally inverts the error signal $e_i$. The inverter 140 provides the error signal $e_i$ to the integrator gain amplifier 142. The integrator gain amplifier 142 operably multiples the error signal by an integrating gain factor. The integrating gain factor ki in the exemplary embodiment described herein is given by the equation:

$$ki = kr * Ts/Ti,$$

where kr is the proportional gain factor discussed above, Ts is the sample time of the control module 102, and Ti is the time constant of the integrating portion 112. With respect to Ts, it is noted that as discussed above, the control module 102 is in this embodiment a programmed processing device that operates with digital signals w and x in the form of clocked samples. The value Ts is used to convert the time constant Ti such that it is converted to be in terms of time samples, as opposed to time in terms of seconds or some other absolute value. In this manner, the absolute time constant of the integrating portion 112 is not affected by changes in clock speed of the system.

The integrating gain amplifier 142 provides the gain adjusted error signal $e_i$*ki to the integrating summer 146 through the tracking input 144. The tracking input 144 is a summation device that adds the tracking signal value, if any, to the gain adjusted error signal. Further discussion of the tracking signal value and its effect on the integrating portion 112 is discussed further below.

In general, the integrating summer 146 has a first input which receives the gain adjusted error signal ($e_i$*ki), a second input connected to a feedback line 150, and an output connected to the delay 148. The delay 148 is operable to receive a value from the integrating summer 146 and provide that value as an output after a predetermined delay. The delay may suitably be one sample cycle. The output of the delay 148 represents the integrating control output yi, which is provided to the summation device 116 as well as the feedback line 150. The provision of the output of the delay 148 to the feedback path 150 and thus to the integrating summer 146 causes the integrating summer 146 to generate a running summation of accumulated error signal values.

Referring now to the specific architecture of the differential portion 114 of the exemplary embodiment of FIG. 3, the differential portion 114 includes a set point switch 152, an error summation 154, an inverter 156, a differentiating summer 158, a differential amplifier 160, a feedback summation 162, a delay 164 and a differential gain amplifier 166.

The set point switch 152 is an amplification block that may be used effectively to block the set point value w from the differential portion 114. To this end, the set point switch 152 is an amplifier that may be set to provide unity gain, except when the set point is to be blocked from use by the differential portion 114, at which point the amplifier is set to zero. The set point adjust 152 may suitably set to zero in some cases because it is sometimes desirable to suppress changes in the set point w from effecting the operation of the differential portion 114. In particular, because changes in set point w often constitute large abrupt changes, for example, a change in set point temperature from 22° C. to 23° C., it is not desirable to process such changes in the differential portion 114. As a consequence, it has been found that it is desirable to base the operation of the differential portion 114 solely on changes in the process variable value x.

The error summation 154 is operably coupled to receive the set point w via the set point switch 152 and the process variable value x. The error summation 154 provides the error signal $e_d$ as the difference between w and x. In the case in which the set point w is suppressed by the set point switch 152, then value $e_d$ merely represents the process variable x.

In any event, the error summation 154 is operable to provide the difference between those values, the signal $e_d$, to the inverter 156. Similar to the inverters 134 and 140, the inverter 156 optionally inverts the sign of $e_d$. The inverter 156 provides the error signal $e_d$ to a first input of the differential summer 158. The differential summer 158 also has an output connected to the differential amplifier 160 and a second input connected to the output of the delay 164. The differential amplifier 160 is connected to provide its output to the differential gain amplifier 166 and to a first input of the feedback summation 162. The second input of the feedback summation 162 is connected to the output of the delay 164, and the output of the feedback summation 162 is connected to the input of the delay 164.

As is known to those of ordinary skill in the digital signal processing art, the combination of the differential summation 158, the feedback summation 162 and delay 164 provides a differentiating function that generates as an output a value representative of the rate of change in the samples of the adjusted error signal $e_d$. The value of k of the differential amplifier 160 adjusts the sensitivity of the differentiator, and should be below 1.0.

The differential gain amplifier 166 adjusts the extent to which the rate of change value provided by the differential amplifier 160 affects the overall control output value y3. In the embodiment described herein, the differential gain amplifier provides a gain kd given by the equation:

$$kd = kr*Td/Ts$$

where Td is the time constant of the differentiator. As discussed above, Ts represents the sample time of the system. As a consequence, Td/Ts is equal to the time constant of the differentiator in terms of samples.

The differential gain amplifier 166 is operably connected to provide its output, yd, to the summation device 118.

The calculated control output value y3 is generated by the summation devices 116 and 118 using the outputs yi, yp and yd, and a bias value. As noted above, the proportional portion 110 and the integrating portion 112 provide their output values yp and yi, respectively, to inputs of the summation device 116. The summation device 116 is operable to generate an interim sum y1 thereof and is connected to provide the interim sum to a first input of the bias input device 170. The bias input device 170 is another summation device, and has a second input connected to the bias input 172 of the PID control module 102. The bias input 172 provides the bias input value of the control module 102. The bias input value is used to bias the response of the transfer function as is known in the art. Those of ordinary skill in the art may readily determine the appropriate bias input value for their particular implementation.

The output signal value of the bias input device 170 is provided to a first input of the summation device 118. A second input of the summation device 118, as discussed above, is connected to receive yd from the differential gain amplifier 166 of the differential portion 114. The output of the summation device 118 provides the calculated control output value y3, which is representative of the application of the error signal e ($e_p$, $e_i$, $e_d$) to the transfer function of the PID control module 102.

The controller 100 further includes a sample and hold block 174, an override switch 176, a shutoff switch 178 and an output limiter 180 that may alter the control output value y of the controller 100. In particular, the controller 100 may be characterized as having a number of modes: normal mode, dead zone mode, manual override mode, and shutoff mode. In normal mode, the calculated control output y3 is provided as the control output y of the controller 100. In dead zone mode, the sample and hold block 174 replaces the calculated control output y3 with a held control output value. As discussed above, such operation temporarily disconnects the control output y from any ongoing influence of the error signal e when the error signal e is relatively small. In manual override mode, the override switch 176 replaces the calculated control output y3 with a separate override input value that is determined external to the controller 100. The manual override mode allows for external, direct control over the actuator to which the controller is attached. In shutoff mode, the shutoff switch 178 replaces the calculated control output y3 (or any override value or held value) with a predetermined constant value. Such a mode may be used to place an actuator in a neutral or off state.

The output limiter 180 operates to limit the extreme values of the control output so as to avoid attempts to place an actuator in an unreachable state. In particular, the output limiter 180 places positive and negative limits on the control output y. If the control output value provided to the output limiter 180 exceeds a limit, the control output is changed such that its value is equal to, or close to, the limit that was exceeded.

Referring to the various output circuits in further detail, the sample and hold block 174 is the device that generates the held control output value during dead zone operation of the controller 100. In particular, the sample and hold block 174 is operable to generate a held value responsive to hold control signals received from the filter 106. The filter 106, as will be discussed below, generates a hold control signal when the filter 106 determines that the filtered error signal e is in the dead zone.

To this end, the sample and hold block 174 has an input 174*a* connected to receive the calculated control output value, y3, an output 174*b* connected to generate an operating control output value, y4, and a control input 174*c*. The control input 174*c* is connected to the filter 106. The sample and hold block 174 is operable to generate the value y4 in response to the control input 174*c*. If the control input 174*c* receives a non-hold control signal from the filter 106, then the sample and hold block 174 generates y4 by passing through the present value of y3. In other words, y4=y3. However, if the control input 174*c* receives a hold control signal from the filter 106, then the sample and hold block 174 holds the output y4 equal to the value of y3 at the time the hold control signal was received. Until a subsequent non-hold control signal is received, the sample and hold block 174 will not update the value of y4, even if the value of y3 changes.

The sample and hold block 174 thus provides a point at which the control output of the controller 100 may be isolated from the error signal during operation in the dead zone mode. In other words, in the dead zone mode, the error signal e does not affect the output y4 because the updates to the calculated control signal y3 do not propagate through to the output y4.

The output 174*b* of the sample and hold block 174 is operably connected to provide the value y4 a first switched input of the override switch 176. As discussed above, the override switch 176 allows for operation of an override mode in which the control output y4 of the PID control module 102 is overridden with a manual input value. The override mode thereby allows for external control of an actuator, and ultimately disconnects the PID control module 102 from the actuator.

To this end, the override switch 176 has a second switched input is connected to receive an override input value uman. The override switch 176 is operable to generate an output value y5 that is equal to either the value y4 (when not in override mode) or the value uman (when in override mode). The override switch 176 also includes a control input that receives a signal indicating whether the switch 176 should operate in override mode. In the exemplary embodiment described herein, the control input is also tied to the uman input. In such a configuration, the override switch 176 only operates in override mode when the uman input is a non-null value. Thus, the uman value is always at a null value until an override value is provided.

In any event, the override switch 176 is operably connected to provide the output value y5 to the shutoff switch 178. The shutoff switch 178 is operable to generate a control output value y6 that is equal to y5 when not in shutoff mode. The shutoff switch 178 is also operable to generate the control value y6 equal to a predetermined constant c when in shutoff mode. The shutoff switch 178 is operably connected to provide the control output value y6 to the output limiter 180. The shutoff switch 178 includes a control input connected to receive a shutoff control signal. In the event of receiving a shutoff control signal in the control input, the shutoff switch 178 sets y6=c. Otherwise, the shutoff switch sets y6=y5. The shutoff switch 178, unlike the override switch 176, does not allow for full manual control or manipulation of the control output y of the controller 100, but rather only provides the ability to cause a predetermined shutoff or default value c to be provided as the control output y6.

As discussed above, the output limiter 180 is a block that determines whether the control output received through the shutoff switch 178 is outside of an acceptable range. The range may be used to prevent a control output y that places the actuator in an unreachable state. For example, the control output provided to the shutoff switch 178 may be a value that corresponds a damper being in a 110% open position. Because the damper cannot be opened more than 100%, the output limiter 180 would convert the value representative of 110% to a value representative of a realistic maximum, for example, 100%.

Accordingly, the output limiter 180 is operable to compare y6 to predetermined thresholds. If y6 is within the predetermined threshold, then the output limiter 180 provides y6 as the control output y. If y6 is not within the predetermined threshold, then the output limiter 180 provides a value at or near the threshold which is exceeded by y6 as the control output y. The control output y represents the output of the entire controller 100. In general, the control output y will be equal to the calculated control output y3 of the PID control module 102 in normal mode. In dead zone mode, y is equal to the held value of y3. In override mode, y=uman. In shutoff mode, y=c. Regardless of mode, the output value is ranged limited to the thresholds of the output limiter 180.

The tracking circuit 104 is an exemplary embodiment of a circuit or algorithm that allows the integrating portion 112 of the PID control module 102 to track to the control output y of the controller 100 even when the control output y has been isolated from the control output value y3 of the PID control module 102, such as in dead zone mode or override mode.

To this end, the tracking circuit 104 includes a tracking combiner 184 and a tracking gain 186. The tracking combiner 184 includes a first input 184a connected to receive the control output y, a second input 184b connected to receive an interim calculated control output, and specifically, the output of the bias input device 170. The tracking combiner 184 further includes an output 184c connected to the tracking gain 186. The tracking combiner 184 is operable to subtract the interim calculated control output at the second input 184b from the control output y at the first input 184a and provide the difference to the output 184c. The tracking gain 186 is operable to multiple the output received from the tracking combiner 184 by the inverse of the time constant of the integrator, given by Ts/Ti. The resulting value is the tracking circuit output value. The tracking gain 186 is operably connected to provide the tracking circuit output value to the tracking input 144.

In general, the tracking circuit 104 as described above provides a value that when added to the error signal e or $e_i$, is operable to cause the integrating portion 112 to be in the proper state with respect to the error signal, even when the error signal is otherwise effectively isolated from the control output y. To this end, the tracking combiner 184 of the tracking circuit 104 subtracts a calculated control output value derived from the integrator 112 from the isolated or held control output value. The result of the subtraction is used by the integrating portion 112 to stabilize, instead of merely incrementally accumulating with the non-zero error signal $e_i$.

In particular, without the tracking circuit 104, the integrating portion 112 would tend to progress to a maximum (or minimum) value when the controller 100 operates in the dead zone mode. In the dead zone mode, the control output y is effectively disconnected from the operation of the PID control module 102. As a consequence, the PID control module 102 cannot operate to reduce the error signal e. Because e is not being reduced, the integrating portion 112 would, in the absence of the tracking circuit 104, continue to integrate or accumulate the non-zero error signals over time. The integrating output value yi would in time arrive at the maximum (or minimum) value. That maximum (or minimum) value, however, does not represent the appropriate state of the integrating portion 112 because it does not take into account that the error signal is disconnected from the held control output value.

The tracking circuit 104 resolves this issue by providing the tracking value at the input 144, which tends to negate the effects of any steady state error e on the output yi. Nevertheless, the tracking value does allow for adjustment of the output yi of the integrating portion 112 in response to changes in error e. Thus, with the tracking circuit 104, the integrating portion 112 can track to an appropriate state when the controller 100 is in the held mode or dead zone mode. It will be appreciated that the tracking circuit 104 further causes the integrating portion 112 to track to the proper state when the controller 100 is in the override mode or disabled mode.

In accordance with another feature of the present invention, the filter 106 is a device that receives information representative of the error signal and generates a hold control signal based thereon. In particular, as discussed further above, the filter 106 typically applies low pass filtering to the error signal e and then determines whether the filtered error signal is within a predetermined range of zero. While such a filter may take many forms, FIGS. 4 and 5 show two separate types of filters that may be used.

FIG. 6 shows a first exemplary filter 202 that may be used as the filter 106 of FIG. 3. The filter 202 includes an error summation 204, a time constant multiplier 206, a lag filter 208, an absolute value block 210, a relay output block 212. In general, the first filter 202 receives the set point w and the process variable value x and provides as an output a value from the relay output block 212. An output value of one corresponds to a hold control signal, which causes dead zone operation. An output of zero corresponds to a non-hold control signal, which causes normal mode operation.

Referring now to the specific structure and operation of the exemplary first filter 202, the error summation 204 is operably coupled to receive the set point w and the process variable value x. The error summation 204 is operable to generate the error signal e from w and x and is operably connected to provide the error signal e to the lag filter 208. The time constant multiplier 206 is operable to receive the value Ts, or sample time of the system, and a multiplier constant const1. The time constant multiplier 206 is operable to provide as an output the value Ts*const1, which represents the time constant of the filter. The time constant multiplier 206 is operably coupled to provide the filter time constant to the lag filter 208.

The lag filter 208 is also connected to receive the sample time value Ts. The lag filter 208 is a digital filter operable to provide a filtered version of the error signal e. To this end, the digital filter may simply be a moving average filter.

In any event, the lag filter 208 is operable to provide the filtered error signal to the absolute value block 210. The absolute value block 210 provides the absolute value of the filtered error signal to the relay output block 212. The relay output block 212 is further operable to receive an on-threshold value const2 and an off-threshold value const3, and is operable to generate an output of one or zero. In general, the relay output block 212 remains in its current output state until the absolute value of the filtered error signal receives a value exceeding the threshold value required for a state change.

In particular, if the output of the relay output block 212 is equal to zero, then the relay output block 212 continues to provide an output of zero until the absolute value of the filtered error signal is less than the on-threshold value const2. As a consequence, if the controller 100 is not currently in dead zone mode, then the filtered error signal must be within a range of zero defined by the on-threshold value const2. Similarly, if the output of the relay output block 212 is equal to one, then the relay output block 212 continues to provide an output of one until the absolute value of the filtered error signal is greater than the off-threshold value const3. As a consequence, if the controller 100 is currently in dead zone mode, then the absolute value of the filtered error signal must exceed the off-threshold value const3.

For example, if the on-threshold value is 0.1° C. and the off-threshold value is 0.15°, then the output of the relay output block 212 will change from zero to one only when the filtered error signal is within ±10.1° of zero, and will change from one to zero only when the filtered error signal extends outside of the range of ±10.15° of zero. By using separate on and off thresholds, the filter 202 employs hysteresis to prevent frequent cycling of the filter 202 between its one and zero output.

The relay output block 212 is operable to provide the filter output to the control input 174c the sample and hold block 174 of the controller 100. (See FIG. 3). If the filter output value is zero, then the sample and hold block 174 allows the calculated control output value y3 to pass through. If and when the filter output value changes to one, the sample and hold block 174 stores the value of y3 at the time of the change and provides the stored, or held value thereafter until the filter output value changes to zero.

FIG. 5 shows an alternative filter 302 that may be used as the filter 106 from FIG. 3. The filter 302 is similar in many ways to the filter 202 of FIG. 4, but includes additional features such as a time constant that is tied to the time constant of the integrating portion 112 of the control module 102 and an off-threshold that is tied to the set point value w.

Linking the filter time constant to the integrating portion 112 of the control module 102 relates the general time base of the system, as defined in part by the time constant Ti of the integrating portion 112, to the filter 302 that determines when to enter into dead zone mode. Linking the off-threshold to the set point w has the effect of expanding the amount of error that is tolerated in dead zone operation when the set point w reaches relatively high levels. Such effect is advantageous in systems in which error in the high end is less perceivable than error in the low end.

Referring specifically to FIG. 5, the filter 302 includes an error summation 304, a set point multiplier 306, a time constant limiter 308, a time constant multiplier 310, a lag filter 312, an absolute value block 314, an off-threshold summation 316, and a relay output block 318. In general, the filter 302 receives the set point w and the process variable value x and provides as an output a value from the relay Output block 318. An output value of one corresponds to the application of dead zone operation. An output of zero corresponds to the application of normal mode operation.

In particular, the error summation 304 is operably coupled to receive the set point w and the process variable value x. The error summation 304 is operable to generate the error signal e from w and x and is operably connected to provide the error signal e to the lag filter 312.

The time constant limiter 308 is operable to receive the time constant Ti of the integrating portion 112 of the controller 100 (see FIG. 3) as well as a high limit value and a low limit value. The time constant limiter 308 is operable to provide limited time constant to the time constant multiplier 310. To this end, the time constant limiter 308 provides one of the following values as the limited time constant: the low limit value if the received Ti value is less than the low limit value; the high limit value if the received Ti value is greater than the high limit value, and the received Ti value if the received Ti value is between the low limit value and the high limit value. Thus, the time constant limiter 308 effectively attempts to link to the time constant Ti of the integrating portion 112 while observing high and low limits.

The time constant multiplier 310 is operable to receive the limited time constant and another constant, const3. The time constant multiplier 310 is operable to provide as an output the product of the limited time constant and const3. That product represents the time constant of the filter 302. The time constant multiplier 310 is operably coupled to provide the filter time constant to the lag filter 312.

The lag filter 312 is also connected to receive the sample time value Ts. The lag filter 312 may suitably be the same as the lag filter 208. The lag filter 312 filters the received error signal in accordance with the filter time constant. Such digital filters are well known in the art.

In any event, the lag filter 312 is operable to provide the filtered error signal to the absolute value block 314. The absolute value block 314 provides the absolute value of the filtered error signal to the relay output block 318. The relay output block 318 is further operable to receive an on-threshold value and an off-threshold value, and is operable to generate an output of one or zero. Like the relay output block 212 of FIG. 6, the relay output block 318 remains in its current output state until the absolute value of the filtered error signal receives a value exceeding the threshold value required for the state change.

In particular, if the output of the relay output block 318 is equal to zero, then the relay output block 318 continues to provide an output of zero until the absolute value of the filtered error signal is less than the on-threshold value. As a consequence, if the controller 100 is not currently in dead zone mode, then the filtered error signal must be within a range of zero defined by the on-threshold value. Similarly, if the output of the relay output block 318 is equal to one, then the relay output block 318 continues to provide an output of one until the absolute value of the filtered error signal is greater than the off-threshold value. As a consequence, if the controller 100 is currently in dead zone mode, then the absolute value of the filtered error signal must exceed the off-threshold value.

Similar to the filter 202 of FIG. 6, the on-threshold value may suitably be a predefined constant, const5. However, unlike the filter 202, the off-threshold value in the filter 302 is variable, and varies as a function of the set point w. To this end, the set point multiplier 306 is operably connected to receive the set point w, a multiply constant km and a divide constant dm. The set point multiplier 306 is operable to generate a set point adjust value which is equal to w*km/dm. The set point multiplier 306 is further operable to provide the set point adjust value to the on-threshold summation 316.

The on-threshold summation 316 is operable to add the set point adjust value to a minimum threshold constant const6 to generate the on-threshold value. The on-threshold summation 316 is operably coupled to provide the on-threshold value to the relay output block 318. As a consequence, the on-threshold value is derived from the set point w, but has an absolute minimum defined by const6.

The relay output block 318 may suitably be connected to provide the filter output to the sample and hold block 174 of the controller 100. In such a case, if the filter output value is zero, then the sample and hold block 174 allows the calculated control output value y3 to pass through. If and when the filter output value changes to one, the sample and hold block 174 stores the value of y3 at the time of the change and provides the stored or held value thereafter until the filter output value changes to zero.

The above-described filters 202 and 302 provide non-limiting examples of filters that may be used to filter the error signal prior to determining whether the error signal is within the dead zone.

It will be appreciated that the above-described embodiments are merely exemplary, and that those of ordinary skill in the art may readily devise their own implementations and adaptations that incorporate the principles of the present invention and fall within the spirit and scope thereof.

We claim:

1. A method of operating a control device having a set point value, an error signal, and a control output, the error signal representative of a difference between a controlled variable and the set point value, the control output operable to affect the controlled variable, the method comprising:
   a) generating the control output based at least in part on the error signal;
   b) holding the control output at a held value independent of the error signal; and
   c) causing an integrating portion within the control device to track the error signal and the held value.

2. The method of claim 1 wherein step b) further comprises holding the control output at the held value when the error signal is within a dead zone, and step c) further comprises causing the integrating portion to track the error signal and the held value when the error is within the dead zone.

3. The method of claim 2, further comprising generating the control output based at least in part on the error signal when the error signal passes out of the dead zone.

4. The method of claim 1, wherein the c) further comprises providing a difference between the held value and an output of the integrating portion to an input of the integrating portion.

5. The method of claim 4, wherein c) further comprises summing the provided difference with the error signal.

6. The method of claim 1, further comprising providing an override input value to the control output upon receipt of an override input signal.

7. The method of claim 6, further comprising causing the integrating portion within the control device to track the error signal and the override input value when the override input value is provided to the control output.

8. The method of claim 6 wherein the override input signal comprises the override input value.

9. A control system comprising:
   an actuator having a first input, the actuator operable to effect a process in response to the first input;
   a controller operably coupled to receive the controlled variable and a setpoint value, the controlled variable representative of an output of the process, the controller further operably connected to provide a control output to the first input of the actuator, the controller operable to
   generate an error signal representative of a difference between the controlled variable and the setpoint value,
   generate the control output based at least in part on the error signal, hold the control output at a held value independent of the error signal, and
   cause an integrating portion within the controller to track the error signal and the held value.

10. The control system of claim 9 wherein the controller is further operable to:
    hold the control output at the held value when the error signal is in a dead zone; and
    cause the integrating portion to track the error signal when the error signal is in the dead zone.

11. The control system of claim 10 wherein the controller is further operable to resume generation of the control output based at least in part on the error signal when the error signal passes out of the dead zone.

12. The control system of claim 11 wherein the controller is further operable to provide a difference between the held value and an output of the integrating portion to an input of the integrating portion.

13. The control system of claim 12 wherein the controller is further operable to sum the provided difference with the error signal.

14. The control system of claim 9 wherein the controller is further operable to provide an override input value to the control output upon receipt of an override input signal.

15. The control system of claim 14 wherein the controller is further operable to cause the integrating portion to track the error signal and the override input value when the override input value is provided to the control output.

16. The control system of claim 9 wherein the controller comprises a processing device and a memory.

17. A controller comprising:
    a processing device; and
    a memory containing instructions that, when executed by the processing device, cause the processing device to:
    generate an error signal representative of a difference between a controlled variable and a setpoint value,
    generate a control output based at least in part on the error signal, hold the control output at a held value independent of the error signal when the error signal is within a dead zone, and cause an integrating portion within the controller to track the error signal and the held value when the error signal is within the dead zone.

18. The controller of claim 17 wherein the memory further includes instructions that, when executed by the processing device, cause the processing device to resume generation of the control output based at least in part on the error signal when the error signal passes out of the dead zone.

19. The controller of claim 17 wherein the memory further includes instructions that, when executed by the processing device, cause the processing device to provide a difference between the held value and an output of the integrating portion to an input of the integrating portion.

20. The controller of claim 19 wherein the memory further includes instructions that, when executed by the processing device, cause the processing device to sum the provided difference with the error signal.

21. The controller of claim 17 wherein the memory further includes instructions that, when executed by the processing device, cause the processing device to provide an override input value to the control output upon receipt of an override input signal.

22. The controller of claim 21 wherein the memory further includes instructions that, when executed by the processing device, cause the processing device to cause the integrating portion to track the error signal and the override input value when the override input value is provided to the control output.

23. The method of claim 1, further comprising providing the held value at least indirectly to the integrating portion.

* * * * *